US012663525B2

(12) United States Patent
Aghaei et al.

(10) Patent No.: US 12,663,525 B2
(45) Date of Patent: Jun. 23, 2026

(54) SIMULATION OF LIGHT DETECTION AND RANGING (LiDAR) BEAM-TO-BEAM VARIATION AND DEVICE-TO-DEVICE VARIATION

(71) Applicant: GM Cruise Holdings LLC, San Francisco, CA (US)

(72) Inventors: Amin Aghaei, Fremont, CA (US); Yu Ding, Foster City, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 630 days.

(21) Appl. No.: 18/318,928

(22) Filed: May 17, 2023

(65) Prior Publication Data

US 2024/0385300 A1     Nov. 21, 2024

(51) Int. Cl.
*G01S 7/497*          (2006.01)
*G01S 17/931*         (2020.01)

(52) U.S. Cl.
CPC ............ *G01S 7/497* (2013.01); *G01S 17/931* (2020.01)

(58) Field of Classification Search
CPC ............................... G01S 7/497; G01S 17/931
See application file for complete search history.

(56) References Cited

U.S. PATENT DOCUMENTS

| | | | |
|---|---|---|---|
| 12,162,515 B1 * | 12/2024 | Srivastav | G01S 13/931 |
| 2022/0146652 A1 * | 5/2022 | Cardei | G01S 7/497 |
| 2023/0135965 A1 * | 5/2023 | Hu | B60W 40/10 |
| | | | 382/104 |
| 2024/0184258 A1 * | 6/2024 | Murchison | G06F 11/3698 |
| 2024/0219536 A1 * | 7/2024 | Yang | G01S 17/42 |
| 2024/0220675 A1 * | 7/2024 | Aghaei | G06F 30/20 |

* cited by examiner

*Primary Examiner* — Michael Lee
(74) *Attorney, Agent, or Firm* — CANTOR COLBURN LLP

(57)          ABSTRACT

Systems and techniques are provided for simulating LiDAR sensors. An example method includes generating, within a simulation environment, a first Light Detection and Ranging (LiDAR) measurement that corresponds to a first virtual beam transmission from a first channel of a first LiDAR sensor; generating, within the simulation environment, a second LiDAR measurement that corresponds to a second virtual beam transmission from a second channel of the first LiDAR sensor, wherein the first virtual beam transmission and the second virtual beam transmission are directed to a virtual object in the simulation environment; determining a channel measurement variance between the first channel and the second channel; and adjusting at least one of the first LiDAR measurement and the second LiDAR measurement based on the channel measurement variance.

20 Claims, 8 Drawing Sheets

300

Output Layer
621

Hidden Layer
622n

Hidden Layer
622b

Hidden Layer
622a

Input Layer
620

600

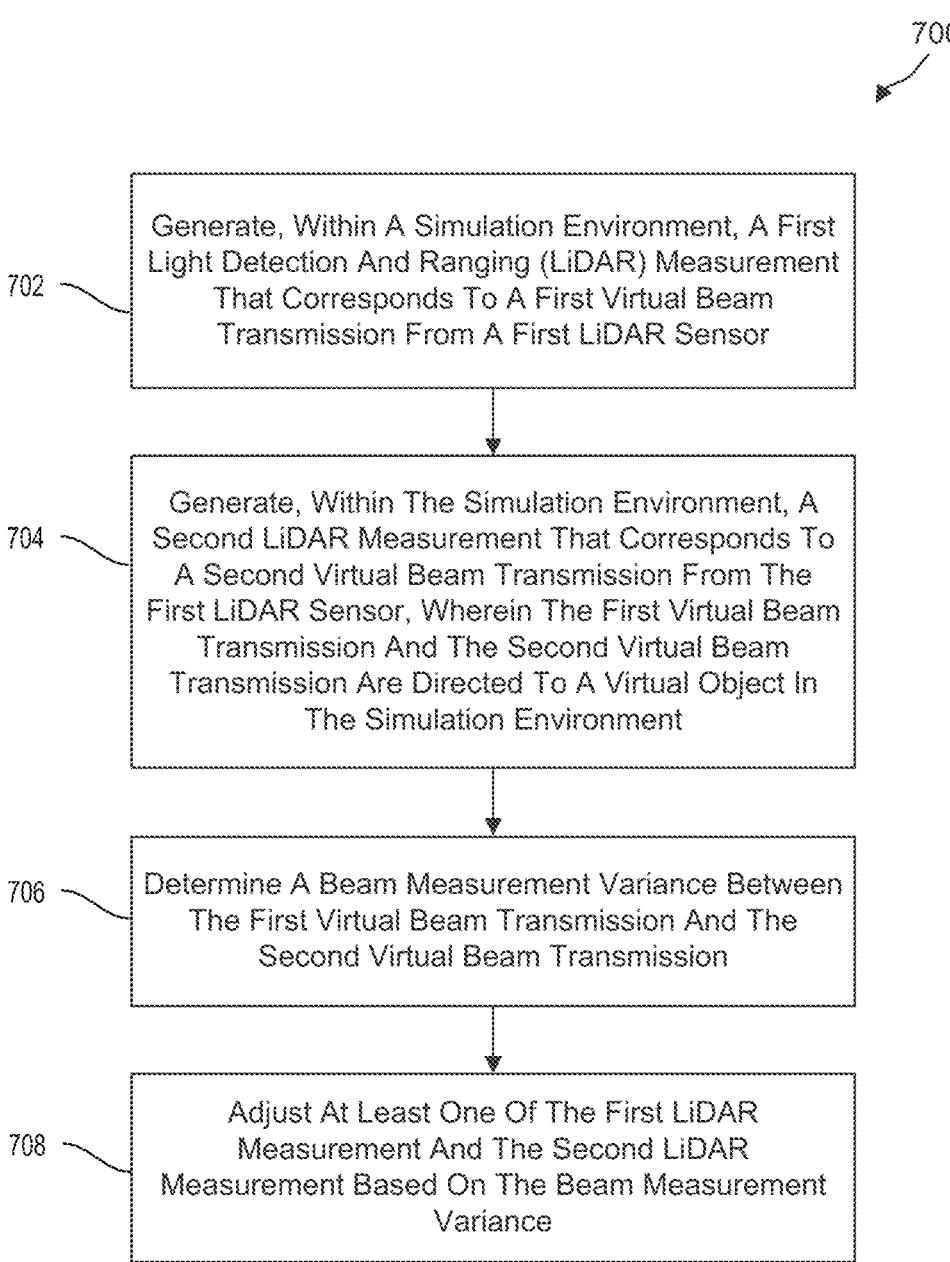

700

702 — Generate, Within A Simulation Environment, A First Light Detection And Ranging (LiDAR) Measurement That Corresponds To A First Virtual Beam Transmission From A First LiDAR Sensor 704 — Generate, Within The Simulation Environment, A Second LiDAR Measurement That Corresponds To A Second Virtual Beam Transmission From The First LiDAR Sensor, Wherein The First Virtual Beam Transmission And The Second Virtual Beam Transmission Are Directed To A Virtual Object In The Simulation Environment 706 — Determine A Beam Measurement Variance Between The First Virtual Beam Transmission And The Second Virtual Beam Transmission 708 — Adjust At Least One Of The First LiDAR Measurement And The Second LiDAR Measurement Based On The Beam Measurement Variance

FIG. 7

SIMULATION OF LIGHT DETECTION AND RANGING (LiDAR) BEAM-TO-BEAM VARIATION AND DEVICE-TO-DEVICE VARIATION

BACKGROUND

1. Technical Field

The present disclosure generally relates to autonomous vehicles and, more specifically, to simulating beam-to-beam variation and device-to-device variation for Light Detection and Ranging (LiDAR) sensors used by autonomous vehicles.

2. Introduction

Sensors are commonly integrated into a wide array of systems and electronic devices such as, for example, camera systems, mobile phones, autonomous systems (e.g., autonomous vehicles, unmanned aerial vehicles or drones, autonomous robots, etc.), computers, smart wearables, and many other devices. The sensors allow users to obtain sensor data that measures, describes, and/or depicts one or more aspects of a target such as an object, a scene, a person, and/or any other targets. For example, an image sensor can be used to capture frames (e.g., video frames and/or still pictures/images) depicting a target(s) from any electronic device equipped with an image sensor. As another example, a light detection and ranging (LiDAR) sensor can be used to determine ranges (variable distance) of one or more targets by directing a laser to a surface of an entity (e.g., a person, an object, a structure, an animal, etc.) and measuring the time for light reflected from the surface to return to the LiDAR.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 7 is a flowchart illustrating an example process for simulating LiDAR beam-to-beam variation and/or device-to-device variation, according to some examples of the present disclosure.

DETAILED DESCRIPTION

Figure 1:
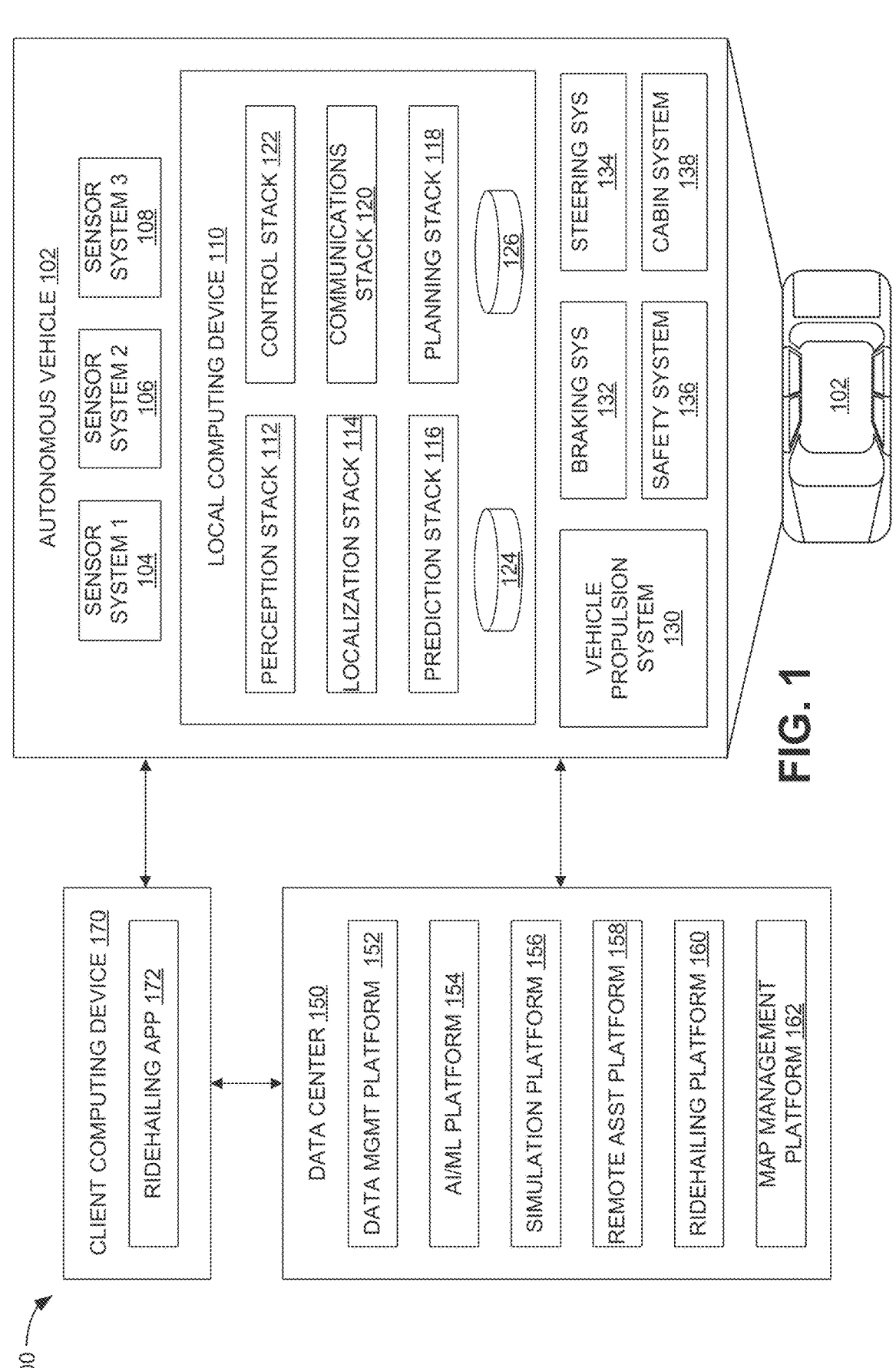
FIG. 1 is a diagram illustrating an example system environment that can be used to facilitate autonomous vehicle (AV) navigation and routing operations, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Generally, sensors are integrated into a wide array of systems and electronic devices such as, for example, camera systems, mobile phones, autonomous systems (e.g., autonomous vehicles, unmanned aerial vehicles or drones, autonomous robots, etc.), computers, smart wearables, and many other devices. The sensors allow users to obtain sensor data that measures, describes, and/or depicts one or more aspects of a target such as an object, a scene, a person, and/or any other targets. For example, an image sensor can be used to capture frames (e.g., video frames and/or still pictures/images) depicting a target(s) from any electronic device equipped with an image sensor. As another example, a light detection and ranging (LiDAR) sensor can be used to determine ranges (variable distance) of one or more targets by directing a laser to a surface of an entity (e.g., a person, an object, a structure, an animal, etc.) and measuring the time of flight (e.g., time to receive reflection corresponding to LiDAR transmission). In a LiDAR system, a LiDAR sensor emits light waves (laser signals) from a laser into the environment. The laser signals can reflect off the surface of surrounding objects and return to the LiDAR sensor, which can use the return signal to determine ranges and/or intensity parameters.

In some cases, LiDAR sensors may exhibit beam-to-beam variation that introduces noise, distortion, bias, etc. in the LiDAR measurements obtained using different LiDAR channels. For example, measurements (e.g., range measurements and/or intensity measurements) that are obtained using different beams or channels that are transmitting using the same power level may vary even though the transmitted beams reflect from the same object. That is, under ideal (e.g., noiseless) conditions, the measurements corresponding to different transmission beams would yield the same range measurement and the same intensity measurement when the transmission beams reflect from the same target. However, beam-to-beam variation can cause such measurements to differ.

In some examples, LiDAR sensors may also exhibit device-to-device variation that may also introduce noise, distortion, bias, etc. in the LiDAR measurements obtained using multiple LiDAR sensors. For example, two LiDAR sensors of the same model (e.g., same hardware) may report different range and/or intensity measurements for the same target. In one illustrative example, a planar target may be placed in the field of view of two LiDAR sensors that use the same hardware, and the averaged range and/or intensity measurements may be different.

In some cases, the beam-to-beam variation and/or device-to-device variation exhibited by LiDAR sensors can be due to factors such as internal miscalibrations, age of unit(s), heat, cleanliness (e.g., cloudy or obscured optics), and/or any other factor that may affect LiDAR sensor measurements. In some aspects, a simulation framework may not accurately simulate LiDAR performance if it fails to account for device-to-device variation and/or beam-to-beam variation.

Accurate simulation of LiDAR performance is critical to the development of autonomous vehicles. For example, software developers rely on simulations to configure modules such as the perception stack that relies on sensor data to detect and identify objects in the vicinity of the autonomous vehicle. In some cases, simulations of LiDAR sensors use ideal LiDAR measurements in which there is no noise or variation in the measurements associated with channels that reflect from the same object. Also, the ideal LiDAR measurements may not include any noise or variation in the measurements obtained using different LiDAR devices (e.g., device-to-device variation).

Systems, apparatuses, processes (also referred to as methods), and computer-readable media (collectively referred to as "systems and techniques") are described herein for simulating beam-to-beam variation and/or device-to-device variation in LiDAR sensors. In some cases, a LiDAR sensor model in a simulation framework may determine when multiple transmission beams from a LiDAR device are transmitted using the same transmission power and reflect from the same target. In some aspects, the LiDAR sensor model may adjust measurements associated with one or more of the transmission beams in order to inject or introduce beam-to-beam variation. In some examples, the beam-to-beam variance can be based on the transmission power level, the reflectivity of the target, and/or the distance between the target and the LiDAR sensor.

In some cases, the LiDAR sensor model in the simulation framework may determine when measurements from two or more LiDAR sensors correspond to the same target. In some examples, the LiDAR sensor model may introduce device-to-device variation by modifying or adjusting one or more of the measurements from one or more of the LiDAR sensors. For instance, the LiDAR sensor model may use a LiDAR variance database to adjust the range measurement and/or the intensity measurement from one of the LiDAR sensors.

FIG. 1 is a diagram illustrating an example autonomous vehicle (AV) environment 100, according to some examples of the present disclosure. One of ordinary skill in the art will understand that, for AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

Prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

Planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102

(e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

Control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

Communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls layer can include geospatial information of traffic signal lights, traffic signs, and other road objects and related attributes.

AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

Data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ride-hailing service (e.g., a ridesharing service), a delivery service, a remote/roadside assistance service, street services (e.g., street mapping, street patrol, street cleaning, street metering, parking reservation, etc.), and the like.

Data center 150 can send and receive various signals to and from the AV 102 and the client computing device 170. These signals can include sensor data captured by the sensor systems 104-108, roadside assistance requests, software updates, ride-hailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ride-hailing platform 160, and a map management platform 162, among other systems.

Data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ride-hailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

Simulation platform 156 can enable testing and validation of the algorithms, machine learning models, neural networks, and other development efforts for the AV 102, the remote assistance platform 158, the ride-hailing platform 160, the map management platform 162, and other platforms and systems. Simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

Remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

Ride-hailing platform 160 can interact with a customer of a ride-hailing service via a ride-hailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 172. The client computing device 170 can be a customer's mobile computing device or a computing device integrated with the AV 102 (e.g., the local computing device 110). The ride-hailing platform 160 can receive requests to pick up or drop off from the ride-hailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ride-hailing platform 160 may incorporate the map viewing services into the ride-hailing application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 8.

Figure 2:
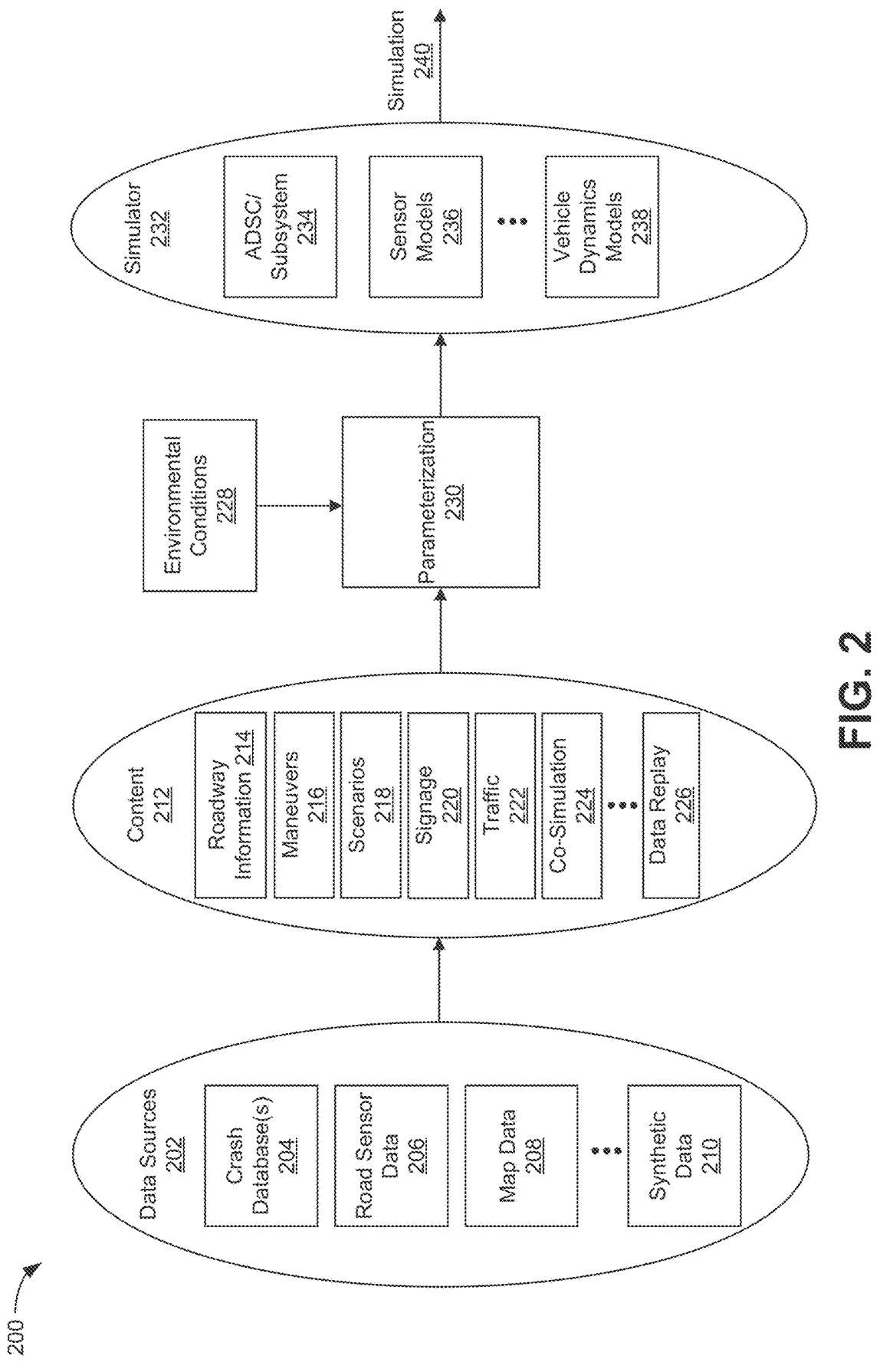
FIG. 2 is a diagram illustrating an example simulation framework, according to some examples of the present disclosure.

FIG. 2 is a diagram illustrating an example simulation framework 200, according to some examples of the present disclosure. The example simulation framework 200 can include data sources 202, content 212, environmental conditions 228, parameterization 230, and simulator 232. The components in the example simulation framework 200 are merely illustrative examples provided for explanation purposes. In other examples, the simulation framework 200 can include other components that are not shown in FIG. 2 and/or more or less components than shown in FIG. 2.

The data sources 202 can be used to create a simulation. The data sources 202 can include, for example and without limitation, one or more crash databases 204, road sensor data 206, map data 208, and/or synthetic data 210. In other examples, the data sources 202 can include more or less sources than shown in FIG. 2 and/or one or more data sources that are not shown in FIG. 2.

The crash databases 204 can include crash data (e.g., data describing crashes and/or associated details) generated by vehicles involved in crashes. The road sensor data 206 can include data collected by one or more sensors (e.g., one or more camera sensors, LiDAR sensors, RADAR sensors, SONAR sensors, IMU sensors, GPS/GNSS receivers, and/or any other sensors) of one or more vehicles while the one or more vehicles drive/navigate one or more real-world environments. The map data 208 can include one or more maps (and, in some cases, associated data) such as, for example and without limitation, one or more high-definition (HD) maps, sensor maps, scene maps, and/or any other maps. In some examples, the one or more HD maps can include roadway information such as, for example, lane widths, location of road signs and traffic lights, directions of travel for each lane, road junction information, speed limit information, etc.

The synthetic data 210 can include virtual assets, objects, and/or elements created for a simulated scene, a virtual scene and/or virtual scene elements, and/or any other synthetic data elements. For example, in some cases, the synthetic data 210 can include one or more virtual vehicles, virtual pedestrians, virtual roads, virtual objects, virtual environments/scenes, virtual signs, virtual backgrounds, virtual buildings, virtual trees, virtual motorcycles/bicycles, virtual obstacles, virtual environmental elements (e.g., weather, lightening, shadows, etc.), virtual surfaces, etc. In some aspects, the synthetic data 210 can include synthetic sensor data such as synthetic camera data, synthetic LiDAR data, synthetic RADAR data, synthetic IMU data, and/or any other type of synthetic sensor data.

In some examples, data from some or all of the data sources 202 can be used to create the content 212. The content 212 can include static content and/or dynamic content. For example, the content 212 can include roadway information 214, maneuvers 216, scenarios 218, signage 220, traffic 222, co-simulation 224, and/or data replay 226. The roadway information 214 can include, for example, lane information (e.g., number of lanes, lane widths, directions of travel for each lane, etc.), the location and information of road signs and/or traffic lights, road junction information, speed limit information, road attributes (e.g., surfaces, angles of inclination, curvatures, obstacles, etc.), road topologies, and/or other roadway information. The maneuvers 216 can include any AV maneuvers, and the scenarios 218 can include specific AV behaviors in certain AV scenes/environments. The signage 220 can include signs such as, for example, traffic lights, road signs, billboards, displayed messages on the road, etc. The traffic 222 can include any traffic information such as, for example, traffic density, traffic fluctuations, traffic patterns, traffic activity, delays, positions of traffic, velocities, volumes of vehicles in traffic, geometries or footprints of vehicles, pedestrians, spaces (occupied and/or unoccupied), etc.

The co-simulation 224 can include a distributed modeling and simulation of different AV subsystems that form the larger AV system. In some cases, the co-simulation 224 can include information for connecting separate simulations together with interactive communications. In some cases, the co-simulation 224 can allow for modeling to be done at a subsystem level while providing interfaces to connect the subsystems to the rest of the system (e.g., the autonomous driving system computer). Moreover, the data replay 226 can include replay content produced from real-world sensor data (e.g., road sensor data 206).

The environmental conditions 228 can include any information about environmental conditions 228. For example, the environmental conditions 228 can include atmospheric conditions, road/terrain conditions (e.g., surface slope or gradient, surface geometry, surface coefficient of friction, road obstacles, etc.), illumination, weather, road and/or scene conditions resulting from one or more environmental conditions, etc.

The content 212 and the environmental conditions 228 can be used to create the parameterization 230. The parameterization 230 can include parameter ranges, parameterized scenarios, probability density functions of one or more parameters, sampled parameter values, parameter spaces to be tested, evaluation windows for evaluating a behavior of an AV in a simulation, scene parameters, content parameters, environmental parameters, etc. The parameterization 230 can be used by a simulator 232 to generate a simulation 240.

The simulator 232 can include a software engine(s), algorithm(s), neural network model(s), and/or software component(s) used to generate simulations, such as simulation 240. In some examples, the simulator 232 can include autonomous driving system computer (ADSC)/subsystem models 234, sensor models 236, and a vehicle dynamics model 238. The ADSC/subsystem models 234 can include models, descriptors, and/or interfaces for the ADSC and/or ADSC subsystems such as, for example, a perception stack (e.g., perception stack 112), a localization stack (e.g., localization stack 114), a prediction stack (e.g., prediction stack 116), a planning stack (e.g., planning stack 118), a communications stack (e.g., communications stack 120), a control stack (e.g., control stack 122), a sensor system(s), and/or any other subsystems.

The sensor models 236 can include mathematical representations of hardware sensors and an operation (e.g., sensor data processing) of one or more sensors (e.g., a LiDAR, a RADAR, a SONAR, a camera sensor, an IMU, and/or any other sensor). For example, sensor models 236 can include a LiDAR sensor model that simulates operation of a LiDAR sensor. That is, a LiDAR sensor model can be used to simulate transmission of LiDAR beams in the simulation 240 and can simulate LiDAR measurements such as range, intensity, etc. corresponding to one or more objects in the simulation 240. The vehicle dynamics model 238 can model vehicle behaviors/operations, vehicle attributes, vehicle trajectories, vehicle positions, etc.

Figure 3:
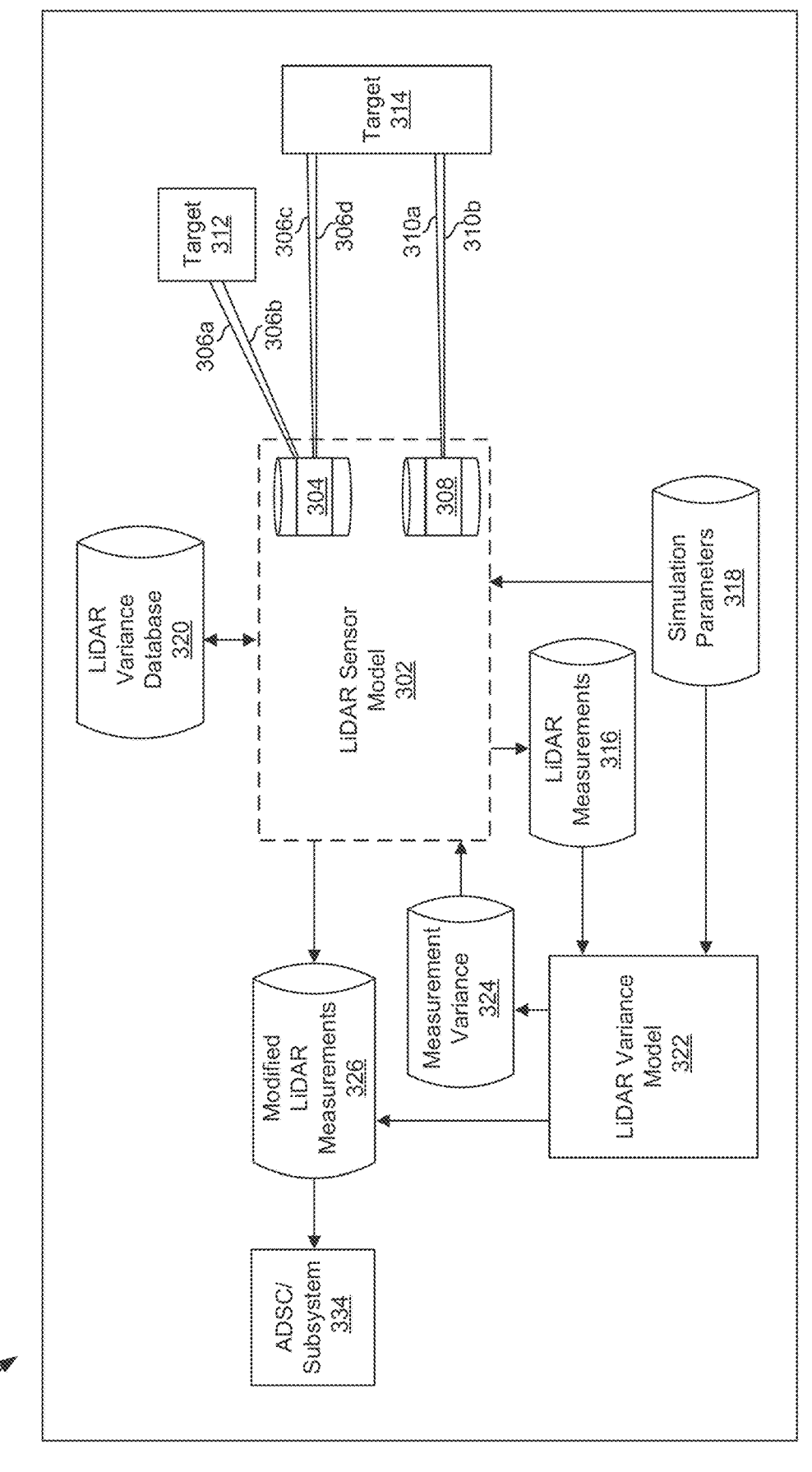
FIG. 3 is a diagram illustrating an example of a simulation framework for simulating beam-to-beam variation and/or device-to-device variation for Light Detection and Ranging (LiDAR) sensors, according to some examples of the present disclosure.

FIG. 3 is a diagram illustrating an example of a simulation environment 300 for implementing a LiDAR sensor model that may be used to simulate beam-to-beam variation and/or device-to-device variation, according to some examples of the present disclosure. As noted above, real-world LiDAR sensors typically exhibit beam-to-beam variation that can result in different LiDAR measurements (e.g., range measurements and/or intensity measurements) from LiDAR beams that reflect from the same target. Also, real-world systems that include multiple LiDAR sensors typically exhibit device-to-device variation that can result in different LiDAR measurements from different LiDAR devices that are measuring the same target. In some aspects, simulation environment 300 can be used to simulate such variations to better mimic or replicate real-world performance of LiDAR devices.

In some examples, simulation environment 300 can include LiDAR sensor model 302. In some instances, LiDAR sensor model 302 may be part of sensor models 236. In some cases, LiDAR sensor model 302 can be used to model or simulate the performance of one or more real-world LiDAR sensors. For example, LiDAR sensor model 302 may include one or more models (e.g., LiDAR sensor 304 and/or LiDAR sensor 308) for simulating the performance of different LiDAR sensors. In some aspects, LiDAR sensor 304 and/or LiDAR sensor 308 may correspond to a LiDAR sensor that is used as part of sensor systems 104-108. In some aspects, LiDAR sensor 304 and/or LiDAR sensor 308 may be used to simulate a rotating or spinning LiDAR sensor that is capable of capturing a 360-degree field of view. In some instances, LiDAR sensor 304 and/or LiDAR sensor 308 may be used to simulate a scanning LiDAR sensor that is fixed in place and is directed in a single direction with a limited field of view.

In some aspects, LiDAR sensor model 302 can be used to simulate LiDAR devices having multiple channels that are configured to transmit and receive light beams. For example, LiDAR sensor 304 can have transmission channels that are configured to generate beam transmission 306*a*, beam transmission 306*b*, beam transmission 306*c*, and beam transmission 306*d* (collectively referred to as "beam transmissions 306") and reception channels that are configured to receive light reflections corresponding to beam transmissions 306. In another example, LiDAR sensor 308 can have transmission channels that are configured to generate beam transmission 310*a* and beam transmission 310*b* (collectively referred to as "beam transmissions 310") and reception channels that are configured to receive light reflections corresponding to beam transmissions 310. Those skilled in the art will recognize that LiDAR sensor 304 and/or LiDAR sensor 308 may be configured to simulate devices having any number of transmission/reception channels (e.g., 64 channels, 128 channels, etc.) and that the present technology is not limited to any particular number of channels or beam transmissions.

In some aspects, beam transmission 306*a* and beam transmission 306*b* from LiDAR sensor 304 can hit and reflect from target 312. In some cases, beam transmission 306*c* and beam transmission 306*d* from LiDAR sensor 304 can hit and reflect from target 314. In some examples, beam transmission 310*a* and beam transmission 310*b* from LiDAR sensor 308 can hit and reflect from target 314.

In some cases, LiDAR sensor model 302 can use beam transmissions 306 and/or beam transmissions 310 to obtain one or more LiDAR measurements 316. In some aspects, LiDAR measurements 316 can include range measurements (e.g., distance measurements) between the LiDAR device and a target (e.g., target 312 and/or target 314). In some instances, the range measurements can be based on the time of flight of a LiDAR transmission.

In some examples, LiDAR measurements 316 can include intensity measurements corresponding to a target. In some aspects, an intensity measurement can be a measure of the return signal strength of the laser pulse that generated the reflection. In some instances, the intensity measurement can correspond to a measurement of the transmitted power and/or the received power. In some cases, the intensity measurement can be based on the composition (e.g., reflectivity) of the surface object that caused the reflection (e.g., target 312 and/or target 314). For example, an object made with a retroreflective material can be associated with a relatively high intensity measurement and an object made with a matte material can be associated with a relatively low intensity measurement.

In some examples, the intensity measurement can be based on an angle of incidence formed between a beam transmission and an object (e.g., the angle between a beam incident on a surface and the line perpendicular to the surface at the point of incidence). For example, the incidence angle between beam transmission 306c and target 314 is approximately 0 degrees and may result in a higher intensity measurement than an incidence angle that is greater than 0 degrees. In some configurations, the intensity measurement can also be based on the range (e.g., distance to the reflecting object), the roughness of the reflecting object, and/or the moisture content. In some cases, the intensity measurement can be a dimensionless value. In some aspects, the intensity measurement can correspond to an integer value (e.g., a number between 1 and 256).

In one illustrative example, LiDAR sensor model 302 can use beam transmission 306a and/or beam transmission 306b from LiDAR sensor 304 to measure the range between LiDAR sensor 304 and target 312 and/or to measure the intensity of target 312. In another example, LiDAR sensor model 302 can use beam transmission 306c and/or beam transmission 306d from LiDAR sensor 308 to measure the range between LiDAR sensor 308 and target 314 and/or to measure the intensity of target 314. In another example, LiDAR sensor model 302 can use beam transmission 310a and/or beam transmission 310b from LiDAR sensor 308 to measure the range between LiDAR sensor 308 and target 314 and/or to measure the intensity of target 314.

In some cases, LiDAR measurements 316 that are obtained from different beams striking the same target within simulation environment 300 may be the same. That is, LiDAR measurements 316 may not include beam-to-beam variation and/or device-to-device variation. For example, the range measurement and/or the intensity measurement obtained using beam transmission 306a may be the same as the range measurement and/or the intensity measurement obtained using beam transmission 306b (e.g., measurements associated with target 312). In another example, the range measurement and/or the intensity measurement obtained using beam transmission 306c may be the same as the range measurement and/or the intensity measurement obtained using beam transmission 306d (e.g., measurements associated with target 314). In another example, the range measurement and/or the intensity measurement obtained using beam transmission 310a may be the same as the range measurement and/or the intensity measurement obtained using beam transmission 310b (e.g., measurements associated with target 314).

In some aspects, the LiDAR measurements 316 that are obtained from different LiDAR sensors striking the same target may be the same. For example, the range measurement and/or the intensity measurement obtained using beam transmission 306c and/or beam transmission 306d from LiDAR sensor 304 may be the same as the range measurement and/or the intensity measurement obtained using beam transmission 310a and/or beam transmission 310b from LiDAR sensor 308. That is, both LiDAR sensor 304 and LiDAR sensor 308 have beam transmissions that strike and reflect from target 314.

In some configurations, LiDAR sensor model 302 can modify one or more of LiDAR measurements 316 to yield modified LiDAR measurements 326 that can be used to simulate beam-to-beam variation and/or device-to-device variation. In some aspects, LiDAR sensor model 302 can generate the modified LiDAR measurements 326 by using variance values (e.g., noise values, distortion values, bias values, etc.) obtained from LiDAR variance database 320 to modify or adjust LiDAR measurements 316. In some aspects, LiDAR variance database 320 can include one or more sets of beam-to-beam variance values. In some cases, LiDAR variance database 320 can include one or more sets of device-to-device variance values. In some cases, the data in LiDAR variance database 320 can be a statistical distribution such as a Gaussian distribution, a gamma distribution, a top-hat distribution, and/or any other type of distribution.

In some instances, LiDAR variance database 320 can be based on real-world data. For example, device-to-device variance values and/or beam-to-beam variance values can be determined using data collected by LiDAR sensors mounted on an AV (e.g., sensor systems 104-108). In some aspects, LiDAR variance database 320 can be based on data obtained in a laboratory environment, as described further herein with respect to FIG. 5.

In some aspects, the data in LiDAR variance database 320 can be associated with one or more factors or variables. For example, the beam-to-beam variance values and/or the device-to-device variance values in LiDAR variance database 320 can be associated with factors such as a LiDAR model type (e.g., hardware identifier); a distance or a distance range (e.g., distance between LiDAR sensor and target); a reflectivity or a reflectivity range (e.g., reflectivity of target); a power or power range (e.g., transmission power associated with LiDAR beam); an incidence angle or incidence angle range (e.g., angle between LiDAR beam and target); a LiDAR channel type (e.g., short-range channel, mid-range channel, long-range channel, etc.); and/or any other factor or any combination thereof.

In some cases, LiDAR sensor model 302 may use one or more simulation parameters 318 to identify factors and/or variables that can be used to select variance values from LiDAR variance database 320. In some examples, simulation parameters 318 may include the number of LiDAR sensors being simulated, the position of the LiDAR sensor(s), the type of LiDAR sensor(s) (e.g., hardware identifier), the transmission power of the LiDAR sensors (e.g., transmission power per channel), the position of simulated objects, the size/dimensions of simulated objects, the movement of simulated objects, the reflectivity of simulated objects, simulated weather conditions, and/or any other simulation parameter (e.g., content 212, environmental conditions 228, etc.).

For example, LiDAR sensor model 302 may use simulation parameters 318 to determine the distance between LiDAR sensor 304 and target 312, the distance between LiDAR sensor 304 and target 314, and/or the distance between LiDAR sensor 308 and target 314. In some aspects, LiDAR sensor model 302 may use the distance between a LiDAR sensor and a target as a factor for determining a variance (e.g., variance value or range of variance values) for modifying LiDAR measurements 316 corresponding to beam transmissions 306 and/or beam transmissions 310.

In another example, LiDAR sensor model 302 may use simulation parameters 318 to determine the transmission power associated with beam transmissions 306 and/or beam transmissions 310. In some aspects, LiDAR sensor model 302 may use the transmission power as a factor for determining a variance (e.g., variance value or range of variance values) for modifying LiDAR measurements 316 corresponding to beam transmissions 306 and/or beam transmissions 310.

In another example, LiDAR sensor model 302 may use simulation parameters 318 to determine a reflectivity of target 312 and/or target 314. In some aspects, LiDAR sensor model 302 may use the reflectivity of a target (e.g., target 312 and/or target 314) for determining a variance (e.g., variance value or range of variance values) for modifying LiDAR measurements 316 corresponding to beam transmissions 306 and/or beam transmissions 310.

In some aspects, the factor (e.g., distance, power, reflectivity, etc.) used to select a variance value from LiDAR variance database 320 may correspond to different variance value sets in LiDAR variance database 320. For example, a distance from 0 meters (m) to 50 m may correspond to a first set of variance values, a distance from 50 m to 100 m may correspond to a second set of variance values, and a distance that is greater than 100 m may correspond to a third set of variance values. In another example, the transmission power of a beam transmission may be used to select a set of variance values. In another example, the reflectivity of a target may be used to select a set of variance values. In some aspects, LiDAR sensor model 302 may select the variance value from LiDAR variance database 320 randomly or pseudo-randomly.

In some configurations, the value of the factor (e.g., distance, power, reflectivity, etc.) may be considered in selecting a variance value from LiDAR variance database 320. For example, a reflectivity value that is relatively high may be associated with a larger amount of variation. In some cases, if the reflectivity value is classified as being high, the variance value may be selected using a higher standard deviation (e.g., variance value may be selected from among the 3rd standard deviation). In another example, if the transmission power is classified as being low, the variance may be selected from within the first standard deviation of variance values.

In some cases, LiDAR sensor model 302 may adjust the range measurement and/or the intensity measurement corresponding to beam transmissions 306 and/or beam transmissions 310 based on the variance value selected from a corresponding dataset in LiDAR variance database 320. For example, LiDAR sensor model 302 may determine that beam transmission 306a and beam transmission 306b are both reflecting from target 312. In some aspects, LiDAR sensor model 302 may adjust the range measurement and/or the intensity measurement corresponding to beam transmission 306a and/or beam transmission 306b in order to introduce beam-to-beam variation. In some instances, LiDAR sensor model 302 may adjust the range measurement and/or the intensity measurement corresponding to beam transmission 306a and/or beam transmission 306b by selecting a variance value from LiDAR variance database 320. In some cases, the variance value selected from LiDAR variance database 320 can be based on the distance between LiDAR sensor 304 and target 312, the reflectivity of target 312, the transmission power of beam transmission 306a, the transmission power of beam transmission 306b, and/or any other factor or simulation parameter, and/or any combination thereof.

In another example, LiDAR sensor model 302 may determine that beam transmission 306c and beam transmission 306d from LiDAR sensor 304 are reflecting from the same target (e.g., target 314) as beam transmission 310a and beam transmission 310b from LiDAR sensor 308. In some cases, LiDAR sensor model 302 may adjust the range measurement and/or the intensity measurement corresponding to beam transmission 306c, beam transmission 306d, beam transmission 310a, and/or beam transmission 310b in order to introduce device-to-device variation. In some examples, device-to-device variation may be applied to all of the beam transmissions from a device. For instance, device-to-device variation may be introduced by applying a variation on all measurements associated with LiDAR sensor 304 and/or LiDAR sensor 308. As noted above with respect to beam-to-beam variation, the variance value for device-to-device variation may be selected based on factors such as distance to target, reflectivity, transmission power, etc.

In some aspects, LiDAR sensor model 302 may use the same beam-to-beam variance value and/or device-to-device variance value throughout a simulation (e.g., variance values may remain static through a simulation). In some examples, LiDAR sensor model 302 may select a different variance value for each frame. For example, the variance value for introducing beam-to-beam variation between beam transmission 306c and beam transmission 306d may change every frame or after every 'n' number of frames.

In some cases, LiDAR sensor model 302 may select a different variance value if there is a threshold change in one or more parameters. For example, LiDAR sensor model 302 may select a different variance value (e.g., from LiDAR variance database 320) if the distance between LiDAR sensor 304 and target 314 changes by a threshold value (e.g., 10 m).

In some instances, the device-to-device variance may be based on an average variance among one or more transmission channels. In some cases, the device-to-device variance may be configured at the beginning of a simulation and applied to all measurements that are common to multiple LiDAR sensors (e.g., LiDAR sensor 304 and LiDAR sensor 308).

In some aspects, simulation environment 300 may include a LiDAR variance model 322 that can be configured to determine the variance value for introducing beam-to-beam variation and/or device-to-device variation. In some cases, LiDAR variance model 322 can be a machine learning model that is trained to determine beam-to-beam variance values and/or device-to-device variance values based on one or more factors. For example, LiDAR variance model 322 may use simulation parameters 318 (e.g., beam transmission power, object reflectivity, object size, object position, LiDAR sensor position, etc.) and LiDAR measurements 316 to determine measurement variance 324. In some aspects, measurement variance 324 may correspond to one or more of the variance values stored in LiDAR variance database 320.

In some cases, LiDAR sensor model 302 may use measurement variance 324 from LiDAR variance model 322 to adjust LiDAR measurements 316 and yield modified LiDAR measurements 326. In some examples, LiDAR variance model 322 may use the measurement variance 324 to calculate modified LiDAR measurement 326.

In some configurations, modified LiDAR measurements 326 may be sent to ADSC/Subsystem 334. In some cases, ADSC/Subsystem 334 may correspond to ADSC/Subsystem 234. As noted above, ADSC/Subsystem 334 may include a perception stack (e.g., perception stack 112), a localization stack (e.g., localization stack 114), a prediction stack (e.g., prediction stack 116), a planning stack (e.g., planning stack 118), a communications stack (e.g., communications stack 120), a control stack (e.g., control stack 122), a sensor system(s), and/or any other subsystems.

In some examples, LiDAR sensor model 302 may be configured to provide LiDAR sensor data that is adjusted to account for beam-to-beam variation and/or device-to-device variation to ADSC/Subsystem 234. For example, LiDAR sensor model 302 may provide modified LiDAR measurements 326 to perception stack 112, and the perception stack 112 can use the modified LiDAR measurements 326 to detect and classify objects within simulation environment 300 (e.g., target 312 and/or target 314).

Figure 4:
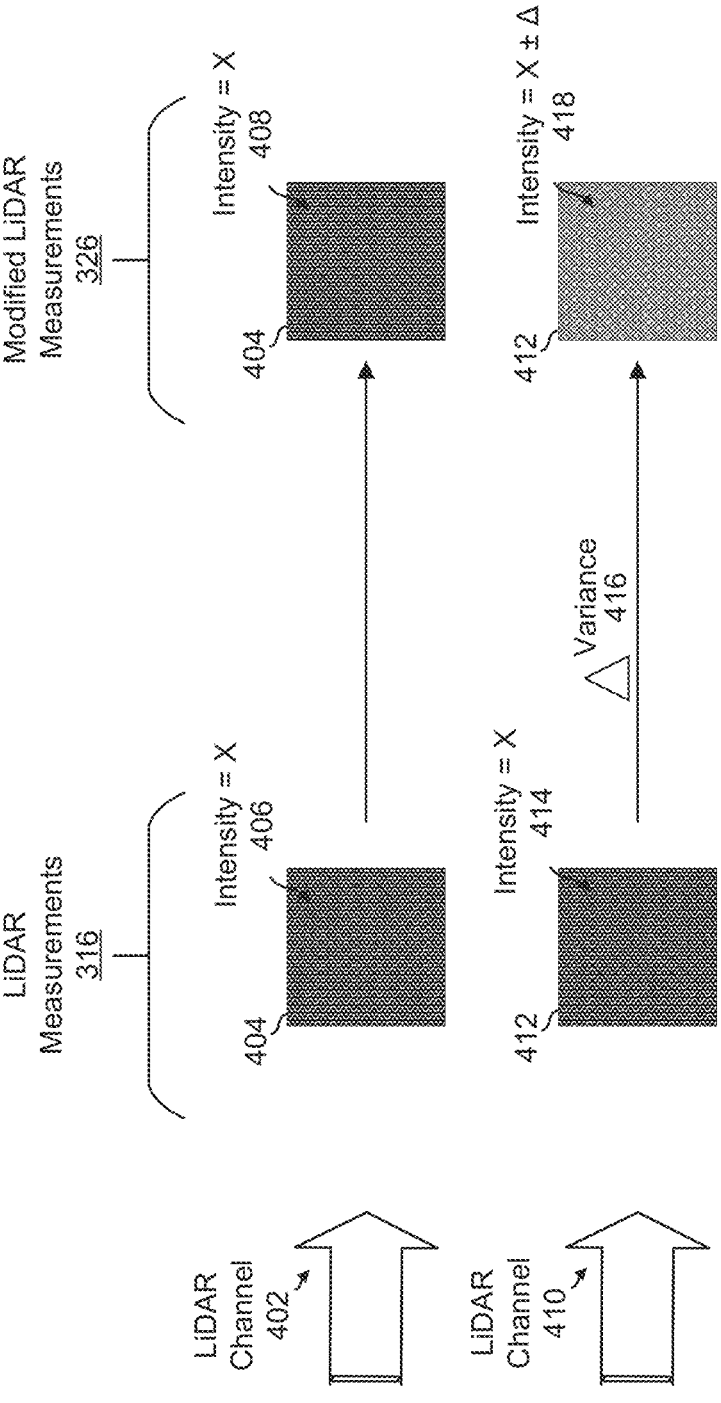
FIG. 4 is a diagram illustrating an example of LiDAR measurement variance simulation, according to some examples of the present disclosure.

FIG. 4 illustrates an example of LiDAR measurement variance simulation. In some aspects, LiDAR channel 402 and LiDAR channel 410 may correspond to channels on a simulated LiDAR sensor (e.g., LiDAR sensor 304 and/or LiDAR sensor 308). In some cases, the transmission beams from LiDAR channel 402 and LiDAR channel 410 may reflect from the same target and be used to determine LiDAR measurements 316.

In some aspects, LiDAR measurements 316 can include a range measurement (not illustrated) and an intensity measurement. For example, intensity 406 may be associated with pixel 404 and intensity 414 may be associated with pixel 412. In some aspects, intensity 406 and intensity 414 may have the same value (e.g., value of "X").

In some cases, one or more of LiDAR measurements 316 may be adjusted to account for beam-to-beam variation (or device-to-device variation) to yield modified LiDAR measurements 326. For example, intensity 414 can be adjusted based on variance 416 to yield intensity 418 for pixel 412. That is, intensity 418 can be equal to the value of intensity 414 (e.g., "X") adjusted by variance 416. As illustrated in FIG. 4, the change in intensity is indicated by a lighter shading in pixel 412. In some cases, the intensity 406 of pixel 404 may remain the same (e.g., intensity 406 may be the same as intensity 408).

Figure 5:
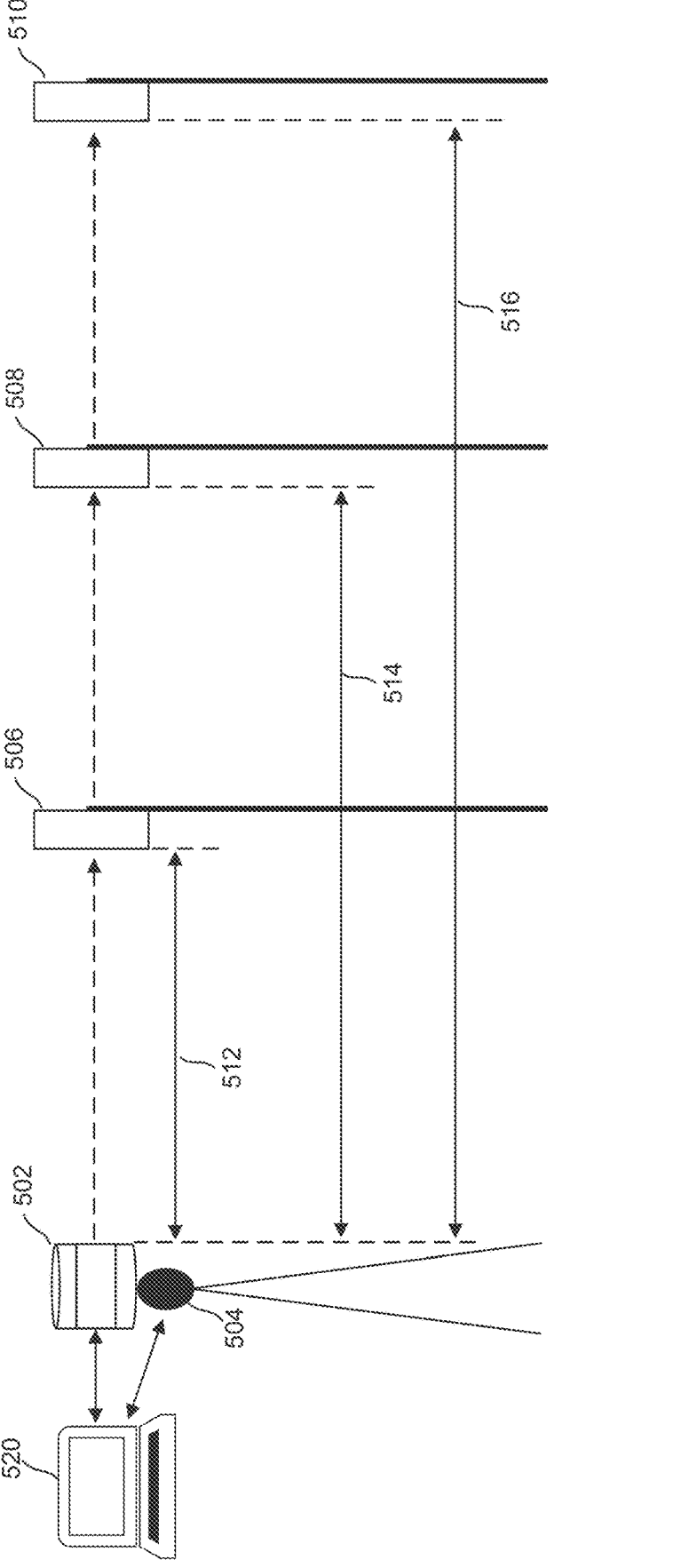
FIG. 5 is a diagram illustrating an example of a system for characterizing LiDAR beam-to-beam variation and/or device-to-device variation, according to some examples of the present disclosure.

FIG. 5 illustrates an example system 500 for testing and characterizing a LiDAR sensor to determine one or more variance values for simulating beam-to-beam variance and/or device-to-device variance. In some aspects, system 500 can include LiDAR sensor 502. In some cases, LiDAR sensor 502 may correspond to a LiDAR sensor that is part of sensor systems 104-108. In some aspects, LiDAR sensor 502 may be simulated using simulation environment 300 (e.g., LiDAR sensor 502 may be simulated using LiDAR sensor model 302).

In some examples, system 500 can include positioning device 504. In some examples, LiDAR sensor 502 can be mounted or coupled to positioning device 504. In some cases, positioning device 504 may include a gimbal and/or a robotic arm that can be configured to adjust the position or pose of LiDAR sensor 502 in one or more directions (e.g., x-axis, y-axis, z-axis, pitch, roll, and/or yaw).

In some aspects, system 500 can include controller 520 that may be coupled to LiDAR sensor 502 and/or positioning device 504. For example, controller 520 can be used to change the position of LiDAR sensor 502 using positioning device 504. In some cases, controller 520 can collect measurement data (e.g., range measurements, intensity measurements, etc.) from LiDAR 502. In some instances, controller 520 can be used to generate LiDAR variance database 320.

In some examples, system 500 may include one or more targets for testing LiDAR sensor 502. For example, system 500 may include a first target 506 that is positioned at a distance 512 from LiDAR sensor 502. In some cases, system 500 may include a second target 508 that is positioned at a distance 514 from LiDAR sensor 502. In some instances, system 500 may include a third target 510 that is positioned at a distance 516 from LiDAR sensor 502. In some aspects, each of the targets (e.g., first target 506, second target 508, and third target 510) may have known reflectivity parameters. In some cases, the targets may have different areas or zones having different reflectivity parameters. In some instances, the targets may be swapped for testing different reflectivity parameters at different distances. For example, a first test iteration may use a retroreflective target for the first target 506 and a second test iteration may use a matte target for the first target 506.

In some aspects, target 506 may correspond to a close-range target in which distance 512 is approximately 20 meters. In some cases, target 508 may correspond to a mid-range target in which distance 514 is approximately 80 meters. In some examples, target 510 may correspond to a long-range target in which distance 516 can be between 140 meters and 200 meters. In some cases, each of target 506, target 508, and target 510 may be positioned at approximately the same height.

In some aspects, positioning device 504 can be portable (e.g., manually and/or automatically). For example, positioning device 504 may be moveable such that distance 512 to target 506, distance 514 to target 508, and/or distance 516 to target 510 can be increased or decreased during testing of LiDAR sensor 502. In one illustrative example, positioning device 504 can be moved or repositioned in one or more increments (e.g., 10 m increments) in order to test/characterize LiDAR sensor 502 at different ranges/distances simultaneously (e.g., using target 506, target 508, and target 510).

In some examples, positioning device 504 can be configured to move LiDAR sensor 502 such that different transmission beams corresponding to different channels of LiDAR sensor 502 are directed to one or more of the targets in system 500 (e.g., target 506, target 508, and/or target 510).

In some cases, controller 520 can configure the transmission power of one or more channels associated with LiDAR sensor 502. For example, controller 520 can configure a set of channels for long-range measurements having a relatively higher transmission power. In another example, controller 520 can configure a set of channels for short-range measurements having a relatively low transmission power. In some cases, controller 520 can record the intensity measurements and/or the range measurements from multiple channels that are similarly configured (e.g., same transmission power) in order to determine beam-to-beam variance. In some cases, controller 520 can collect data associated with beam-to-beam range variance and/or beam-to-beam intensity variance.

In some aspects, system 500 can be used to test multiple LiDAR sensors of the same hardware type in order to determine device-to-device variation. For example, a first series of tests can be performed with Serial No. 123 of LiDAR sensor model ABC and a second series of tests can be performed with Serial No. 456 of the same LiDAR sensor model ABC.

Figure 6:
FIG. 6 illustrates an example of a deep learning neural network that can be used to implement aspects of LiDAR beam-to-beam variance simulation and/or device-to-device variance simulation, according to some aspects of the present disclosure.

In FIG. 6, the disclosure now turns to a further discussion of models that can be used through the environments and techniques described herein. FIG. 6 is an example of a deep learning neural network 600 that can be used to implement all, or a portion of the systems and techniques described herein as discussed above (e.g., neural network 600 can be used to implement LiDAR variance model 322). For example, an input layer 620 can be configured to receive simulation parameters (e.g., LiDAR transmission power, object reflectivity, object location, LiDAR location, LiDAR measurements, etc.). Neural network 600 includes multiple hidden layers 622a, 622b, through 622n. The hidden layers 622a, 622b, through 622n include "n" number of hidden layers, where "n" is an integer greater than or equal to one. The number of hidden layers can be made to include as many layers as needed for the given application. Neural network 600 further includes an output layer 621 that provides an output resulting from the processing performed by the hidden layers 622a, 622b, through 622n. For instance, the output may include modified LiDAR measurements (e.g., adjusted to account for beam-to-beam variation and/or device-to-device variation) and/or measurement variance values that can be used to adjust LiDAR measurements.

Neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622a. For example, as shown, each of the input nodes of the input layer 620 is connected to each of the nodes of the first hidden layer 622a. The nodes of the first hidden layer 622a can transform the information of each input node by applying activation functions to the input node information. The information derived from the transformation can then be passed to and can activate the nodes of the next hidden layer 622b, which can perform their own designated functions. Example functions include convolutional, up-sampling, data transformation, and/or any other suitable functions. The output of the hidden layer 622b can then activate nodes of the next hidden layer, and so on. The output of the last hidden layer 622n can activate one or more nodes of the output layer 621, at which an output is provided. In some cases, while nodes in the neural network 600 are shown as having multiple output lines, a node can have a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622a, 622b, through 622n in order to provide the output through the output layer 621.

In some cases, the neural network 600 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 600 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma(1/2 \, (target - output)^2)$. The loss can be set to be equal to the value of $E\_total$.

The loss (or error) will be high for the initial training data since the actual values will be much different than the predicted output. The goal of training is to minimize the amount of loss so that the predicted output is the same as the training output. The neural network 600 can perform a backward pass by determining which inputs (weights) most contributed to the loss of the network and can adjust the weights so that the loss decreases and is eventually minimized.

The neural network 600 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 600 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

FIG. 7 illustrates a flowchart of an example process 700 for simulating LiDAR beam-to-beam variance and/or device-to-device variance. Although the process 700 depicts a particular sequence of operations, the sequence may be altered without departing from the scope of the present disclosure. For example, some of the operations depicted may be performed in parallel or in a different sequence that does not materially affect the function of process 700. In other examples, different components of an example device or system that implements process 700 may perform functions at substantially the same time or in a specific sequence.

At step 702, the process 700 includes generating, within a simulation environment, a first Light Detection and Ranging (LiDAR) measurement that corresponds to a first virtual beam transmission from a first LiDAR sensor. For example, LiDAR sensor model 302 can generate, within simulation environment 300, a first LiDAR measurement (e.g., LiDAR measurements 316) that corresponds to beam transmission 306c from LiDAR sensor 304.

At step 704, the process 700 includes generating, within the simulation environment, a second LiDAR measurement that corresponds to a second virtual beam transmission from the first LiDAR sensor, wherein the first virtual beam transmission and the second virtual beam transmission are directed to a virtual object in the simulation environment.

For instance, LiDAR sensor model 302 can generate, within simulation environment 300, a second LiDAR measurement (e.g., LiDAR measurements 316) that corresponds to beam transmission 306d from LiDAR sensor 304. In some cases, the first LiDAR measurement and the second LiDAR measurement can include at least one of a range value and an intensity value.

At step 706, the process 700 includes determining a beam measurement variance between the first virtual beam transmission and the second virtual beam transmission. For instance, LiDAR sensor model 302 can determine a channel measurement variance between beam transmission 306c and beam transmission 306d. In some cases, the first virtual beam transmission and the second virtual beam transmission can be associated with a same transmission power. For instance, beam transmission 306c and beam transmission 306d can be associated with the same level of transmission power.

In some examples, the beam measurement variance can be based on a LiDAR beam variance dataset associated with the first LiDAR sensor, wherein the LiDAR beam variance dataset includes a plurality of beam measurement variances that are based on at least one of a distance parameter, a reflectivity parameter, and a power parameter. For instance, LiDAR sensor model 302 can determine the beam measurement variance based on LiDAR variance database 320. In some aspects, LiDAR variance database 320 can include a plurality of beam measurement variances that are associated with a distance parameter, a reflectivity parameter, and/or a power parameter.

In some cases, the LiDAR beam variance dataset can include noise data measurements obtained using LiDAR hardware corresponding to the first LiDAR sensor in a real-world environment. For example, LiDAR variance database 320 can include data measurements obtained using sensor systems 104-108 of AV 102. In another example, LiDAR variance database 320 can include data measurements obtained using a lab environment that includes one or more of the components described in connection with system 500.

In some examples, determining the beam measurement variance between the first virtual beam transmission and the second virtual beam transmission can include selecting the beam measurement variance from a distribution of variances stored in the LiDAR beam variance dataset. For instance, LiDAR sensor model 302 can select the beam measurement variance from a distribution of variances stored within LiDAR variance database 320. In further examples, the measurement variance may be determined using a machine learning model such as LiDAR variance model 322.

As step 708, the process 700 includes adjusting at least one of the first LiDAR measurement and the second LiDAR measurement based on the beam measurement variance. For example, LiDAR sensor model 302 can adjust LiDAR measurements 316 corresponding to beam transmission 306c and/or beam transmission 306d to yield modified LiDAR measurements 326.

In some aspects, the process 700 can include determining a distance between the first LiDAR sensor and the virtual object, wherein the beam measurement variance is determined based on the distance. For example, LiDAR sensor model 302 can determine a distance between LiDAR sensor 304 and target 314, and the beam measurement variance can be determined by using the distance as a parameter to select the beam measurement variance from LiDAR variance database 320.

In some cases, the process 700 may include determining a reflectivity of the virtual object, wherein the beam measurement variance is determined based on the reflectivity. For example, LiDAR sensor model 302 can determine a reflectivity of target 314 (e.g., based on simulation parameters 318), and the beam measurement variance can be determined by using the reflectivity as a parameter to select the beam measurement variance from LiDAR variance database 320.

In some aspects, the process 700 can include generating, within the simulation environment, a third LiDAR measurement that corresponds to a third virtual beam transmission from a second LiDAR sensor, wherein the third virtual beam transmission is directed to the virtual object in the simulation environment; determining a device measurement variance between the first LiDAR sensor and the second LiDAR sensor; and adjusting the third LiDAR measurement based on the device measurement variance. For example, LiDAR sensor model 302 can generate a third LiDAR measurement corresponding to beam transmission 310a from LiDAR sensor 308. In some cases, beam transmission 310a can be directed to target 314 (e.g., same as beam transmission 306c from LiDAR sensor 304).

In some configurations, LiDAR sensor model 302 can determine a device measurement variance between LiDAR sensor 304 and LiDAR sensor 308. In some cases, LiDAR sensor model 302 can adjust the measurement corresponding to beam transmission 310a based on the device measurement variance. In some examples, the device measurement variance can be based on a LiDAR device variance dataset (e.g., LiDAR variance database 320) that is associated with the first LiDAR sensor (e.g., LiDAR sensor 304) and the second LiDAR sensor (e.g., LiDAR sensor 308). In some aspects, the device measurement variance can be applied to all measurements associated with a LiDAR sensor. For example, a device measurement variance can be introduced by applying the device measurement variance to all of the measurements corresponding to beam transmissions 306 and/or beam transmissions 310. In some cases, the device measurement variance may be introduced by varying measurements from one of the LiDAR sensors (e.g., vary measurements from LiDAR sensor 304 or LiDAR sensor 308) while in other examples the device measurement variance may be applied to multiple LiDAR sensor (e.g., LiDAR sensor 304 and/or LiDAR sensor 308). In some configurations, device measurement variance may be modeled separately from beam-to-beam variance. Alternatively, a simulation may include device measurement variance and beam-to-beam variance. That is, a measurement may include a first adjustment corresponding to beam-to-beam variation and a second adjustment corresponding to device-to-device variation.

Figure 8:
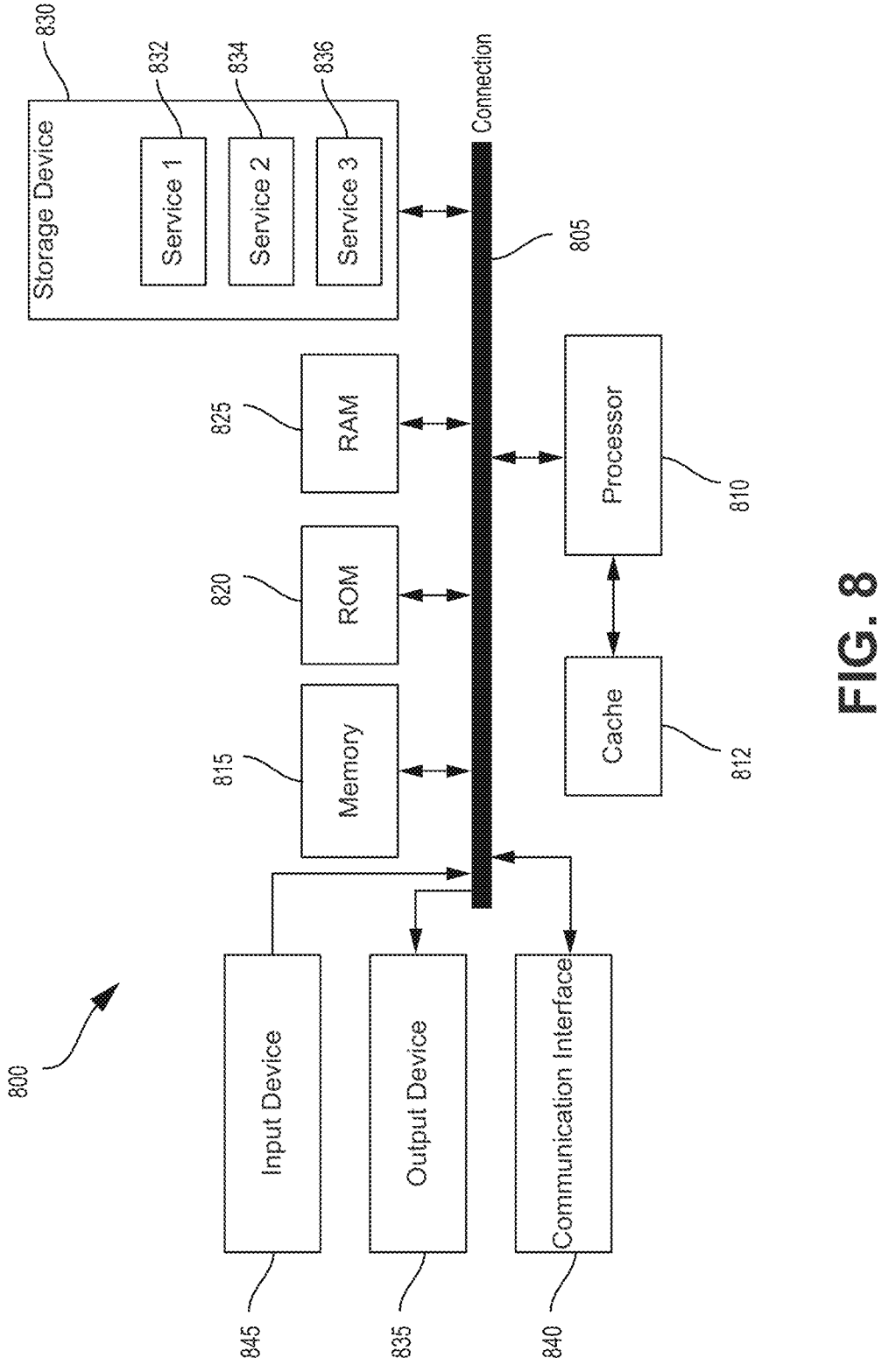
FIG. 8 is a diagram illustrating an example system architecture for implementing certain aspects described herein, according to some examples of the present disclosure.

FIG. 8 illustrates an example processor-based system with which some aspects of the subject technology can be implemented. For example, processor-based system 800 can be any computing device making up local computing device 110, client computing device 170, a passenger device executing the ridesharing application 172, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some examples, computing system 800 is a distributed system in which the functions described in this disclosure can be distributed within a datacenter, multiple data centers, a peer network, etc. In some cases, one or more of the described system components represents many such components each performing some or all of the function for which the component is described. In some cases, the components can be physical or virtual devices.

Example system 800 includes at least one processing unit (CPU or processor) 810 and connection 805 that couples various system components including system memory 815, such as read-only memory (ROM) 820 and random-access memory (RAM) 825 to processor 810. Computing system 800 can include a cache of high-speed memory 812 connected directly with, in close proximity to, and/or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 can include an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L#), resistive random-access memory (RRAM/ReRAM), phase change memory (PCM), spin transfer torque RAM (STT-RAM), another memory chip or cartridge, and/or a combination thereof.

Storage device 830 can include software services, servers, services, etc., that when the code that defines such software is executed by the processor 810, causes the system to perform a function. In some examples, a hardware service that performs a particular function can include the software component stored in a computer-readable medium in connection with the necessary hardware components, such as processor 810, connection 805, output device 835, etc., to carry out the function.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method comprising: generating, within a simulation environment, a first Light Detection and Ranging (LiDAR) measurement that corresponds to a first virtual beam transmission from a first LiDAR sensor; generating, within the simulation environment, a second LiDAR measurement that corresponds to a second virtual beam transmission from the first LiDAR sensor, wherein the first virtual beam transmission and the second virtual beam transmission are directed to a virtual object in the simulation environment; determining a beam measurement variance between the first virtual beam transmission and the second virtual beam transmission; and adjusting at least one of the first LiDAR measurement and the second LiDAR measurement based on the beam measurement variance.

Aspect 2. The method of Aspect 1, wherein the beam measurement variance is based on a LiDAR beam variance dataset associated with the first LiDAR sensor, wherein the LiDAR beam variance dataset includes a plurality of beam measurement variances that are based on at least one of a distance parameter, a reflectivity parameter, and a power parameter.

Aspect 3. The method of Aspect 2, wherein the LiDAR beam variance dataset includes noise data measurements obtained using LiDAR hardware corresponding to the first LiDAR sensor in a real-world environment.

Aspect 4. The method of any of Aspects 2 to 3, wherein the determining of the beam measurement variance between the first virtual beam transmission and the second virtual beam transmission further comprises: selecting the beam measurement variance from a distribution of variances stored in the LiDAR beam variance dataset.

Aspect 5. The method of any of Aspects 1 to 4, wherein the first virtual beam transmission and the second virtual beam transmission are associated with a same transmission power.

Aspect 6. The method of any of Aspects 1 to 5, further comprising: determining a distance between the first LiDAR sensor and the virtual object, wherein the beam measurement variance is determined based on the distance.

Aspect 7. The method of any of Aspects 1 to 6, further comprising: determining a reflectivity of the virtual object, wherein the beam measurement variance is determined based on the reflectivity.

Aspect 8. The method of any of Aspects 1 to 7, wherein the first LiDAR measurement and the second LiDAR measurement include at least one of a range value and an intensity value.

Aspect 9. The method of any of Aspects 1 to 8, further comprising: generating, within the simulation environment, a third LiDAR measurement that corresponds to a third virtual beam transmission from a second LiDAR sensor, wherein the third virtual beam transmission is directed to the virtual object in the simulation environment; determining a device measurement variance between the first LiDAR sensor and the second LiDAR sensor; and adjusting the third LiDAR measurement based on the device measurement variance.

Aspect 10. The method of Aspect 9, wherein the device measurement variance is based on a LiDAR device variance dataset associated with the first LiDAR sensor and the second LiDAR sensor.

Aspect 11. An apparatus comprising: at least one memory; and at least one processor coupled to the at least one memory, wherein the at least one processor is configured to perform operations in accordance with any one of Aspects 1 to 10.

Aspect 11. An apparatus comprising means for performing operations in accordance with any one of Aspects 1 to 10.

Aspect 12. A non-transitory computer-readable medium comprising instructions that, when executed by an apparatus, cause the apparatus to perform operations in accordance with any one of Aspects 1 to 10.

What is claimed is:

1. A system comprising:

a memory; and one or more processors coupled to the memory, the one or more processors being configured to:

generate, within a simulation environment, a first Light Detection and Ranging (LiDAR) measurement that corresponds to a first virtual beam transmission from a first LiDAR sensor;

generate, within the simulation environment, a second LiDAR measurement that corresponds to a second virtual beam transmission from the first LiDAR sensor, wherein the first virtual beam transmission and the second virtual beam transmission are directed to a virtual object in the simulation environment;

determine a beam measurement variance between the first virtual beam transmission and the second virtual beam transmission; and adjust at least one of the first LiDAR measurement and the second LiDAR measurement based on the beam measurement variance.

2. The system of claim 1, wherein the beam measurement variance is based on a LiDAR beam variance dataset associated with the first LiDAR sensor, wherein the LiDAR beam variance dataset includes a plurality of beam measurement variances that are based on at least one of a distance parameter, a reflectivity parameter, and a power parameter.

3. The system of claim 2, wherein the LiDAR beam variance dataset includes noise data measurements obtained using LiDAR hardware corresponding to the first LiDAR sensor in a real-world environment.

4. The system of claim 2, wherein to determine the beam measurement variance between the first virtual beam transmission and the second virtual beam transmission the one or more processors are further configured to:

select the beam measurement variance from a distribution of variances stored in the LiDAR beam variance dataset.

5. The system of claim 1, wherein the first virtual beam transmission and the second virtual beam transmission are associated with a same transmission power.

6. The system of claim 1, wherein the one or more processors are further configured to:

determine a distance between the first LiDAR sensor and the virtual object, wherein the beam measurement variance is determined based on the distance.

7. The system of claim 1, wherein the one or more processors are further configured to:

determine a reflectivity of the virtual object, wherein the beam measurement variance is determined based on the reflectivity.

8. The system of claim 1, wherein the first LiDAR measurement and the second LiDAR measurement include at least one of a range value and an intensity value.

9. The system of claim 1, wherein the one or more processors are further configured to:

generate, within the simulation environment, a third LiDAR measurement that corresponds to a third virtual beam transmission from a second LiDAR sensor, wherein the third virtual beam transmission is directed to the virtual object in the simulation environment;

determine a device measurement variance between the first LiDAR sensor and the second LiDAR sensor; and adjust the third LiDAR measurement based on the device measurement variance.

10. The system of claim 9, wherein the device measurement variance is based on a LiDAR device variance dataset associated with the first LiDAR sensor and the second LiDAR sensor.

11. A method comprising:

generating, within a simulation environment, a first Light Detection and Ranging (LiDAR) measurement that corresponds to a first virtual beam transmission from a first LiDAR sensor;

generating, within the simulation environment, a second LiDAR measurement that corresponds to a second virtual beam transmission from the first LiDAR sensor, wherein the first virtual beam transmission and the second virtual beam transmission are directed to a virtual object in the simulation environment;

determining a beam measurement variance between the first virtual beam transmission and the second virtual beam transmission; and adjusting at least one of the first LiDAR measurement and the second LiDAR measurement based on the beam measurement variance.

12. The method of claim 11, wherein the beam measurement variance is based on a LiDAR beam variance dataset associated with the first LiDAR sensor, wherein the LiDAR beam variance dataset includes a plurality of beam measurement variances that are based on at least one of a distance parameter, a reflectivity parameter, and a power parameter.

13. The method of claim 11, wherein the first virtual beam transmission and the second virtual beam transmission are associated with a same transmission power.

14. The method of claim 11, further comprising:

determining a distance between the first LiDAR sensor and the virtual object, wherein the beam measurement variance is determined based on the distance.

15. The method of claim 11, further comprising:

determining a reflectivity of the virtual object, wherein the beam measurement variance is determined based on the reflectivity.

16. The method of claim 11, further comprising:

generating, within the simulation environment, a third LiDAR measurement that corresponds to a third virtual beam transmission from a second LiDAR sensor, wherein the third virtual beam transmission is directed to the virtual object in the simulation environment;

determining a device measurement variance between the first LiDAR sensor and the second LiDAR sensor; and adjusting the third LiDAR measurement based on the device measurement variance.

17. A non-transitory computer-readable media comprising instructions stored thereon which, when executed are configured to cause a computer or processor to:

generate, within a simulation environment, a first Light Detection and Ranging (LiDAR) measurement that corresponds to a first virtual beam transmission from a first LiDAR sensor;

generate, within the simulation environment, a second LiDAR measurement that corresponds to a second virtual beam transmission from the first LiDAR sensor, wherein the first virtual beam transmission and the second virtual beam transmission are directed to a virtual object in the simulation environment;

determine a beam measurement variance between the first virtual beam transmission and the second virtual beam transmission; and adjust at least one of the first LiDAR measurement and the second LiDAR measurement based on the beam measurement variance.

18. The non-transitory computer-readable media of claim 17, wherein the beam measurement variance is based on a LiDAR beam variance dataset associated with the first LiDAR sensor, wherein the LiDAR beam variance dataset includes a plurality of beam measurement variances that are based on at least one of a distance parameter, a reflectivity parameter, and a power parameter.

19. The non-transitory computer-readable media of claim 17, comprising further instructions configured to cause the computer or the processor to:

determine a distance between the first LiDAR sensor and the virtual object, wherein the beam measurement variance is determined based on the distance.

20. The non-transitory computer-readable media of claim 17, comprising further instructions configured to cause the computer or the processor to:

generate, within the simulation environment, a third LiDAR measurement that corresponds to a third virtual beam transmission from a second LiDAR sensor, wherein the third virtual beam transmission is directed to the virtual object in the simulation environment;

determine a device measurement variance between the first LiDAR sensor and the second LiDAR sensor; and adjust the third LiDAR measurement based on the device measurement variance.

* * * * *